United States Patent
Harrison et al.

(10) Patent No.: US 9,784,966 B1
(45) Date of Patent: Oct. 10, 2017

(54) DEFORMABLE MIRROR FOR EFFICIENT CORRECTION OF LARGE ABERRATIONS

(71) Applicants: Paul Harrison, Rio Rancho, NM (US); Boyd V. Hunter, Albuquerque, NM (US); William P. Walters, Peralta, NM (US)

(72) Inventors: Paul Harrison, Rio Rancho, NM (US); Boyd V. Hunter, Albuquerque, NM (US); William P. Walters, Peralta, NM (US)

(73) Assignee: Kestrel Corporation, Albuquerque, NM (US)

(*) Notice: Subject to any disclaimer, the term of this patent is extended or adjusted under 35 U.S.C. 154(b) by 121 days.

(21) Appl. No.: 14/970,018

(22) Filed: Dec. 15, 2015

Related U.S. Application Data

(60) Provisional application No. 62/092,424, filed on Dec. 16, 2014.

(51) Int. Cl.
   *G02B 27/00*  (2006.01)
   *G01J 9/00*  (2006.01)
   *G02B 26/08*  (2006.01)

(52) U.S. Cl.
   CPC ............ *G02B 26/0825* (2013.01); *G01J 9/00* (2013.01); *G02B 27/005* (2013.01)

(58) Field of Classification Search
   CPC ...... G02B 26/0825; G02B 27/005; G01J 9/00
   USPC ....................................................... 250/201.9
   See application file for complete search history.

(56) References Cited

U.S. PATENT DOCUMENTS 8,182,472 B2 *  5/2012  Yee ...................... A61F 9/00829
                                                          606/4
8,705,692 B2 *  4/2014  Umstadter ........... G01V 5/0016
                                                          250/310

* cited by examiner

*Primary Examiner* — Seung C Sohn
(74) *Attorney, Agent, or Firm* — DeWitt M. Morgan

(57) ABSTRACT

The present invention relates to a deformable mirror, specifically a gimbaled deformable mirror for use with wavefront sensors, which mirror separates the tilt correction from the higher order modes (e.g. defocus, spherical, astigmatism, and coma at higher order aberrations, up to the limits of a particular mirror design) in order to use all of the available mirror deformation stroke for correcting the higher order modes. The separation is done by placing the deformable mirror in a gimbaled structure, so that the deformable mirror can be tilted in two independent, orthogonal axes.

11 Claims, 7 Drawing Sheets

DEFORMABLE MIRROR FOR EFFICIENT CORRECTION OF LARGE ABERRATIONS

CROSS REFERENCE TO RELATED APPLICATIONS

This application is a continuation-in-part of and claims the priority of provisional application Ser. No. 62/092,424, filed Dec. 16, 2014. The subject matter of this provisional is incorporated by reference.

This invention relates to deformable mirrors, specifically a gimbaled deformable mirror for use with wavefront sensors.

BACKGROUND

Deformable mirrors have long been used as the correction element within adaptive optics systems. Such mirrors are typically: solid faceplate structures, where the faceplate is typically a reflective material such as a thin sheet of glass; or MEMS structures where the correction is applied by a plurality of small segmented mirrored surfaces; or membrane mirrors where the reflective surface is fabricated from a flexible polymer film, typically with a nominal radius of curvature bias imparted on the mirror surface.

Solid faceplate structures are best suited for high vibration environments or environments where high optical irradiances are encountered. MEMS mirrors offer a great deal of versatility, but are unsuitable for high power environments and are not well matched to some types of wavefront sensors. Membrane mirrors are inexpensive. but unsuitable for high power or high vibration environments. Furthermore, the base curvature in the mirror needs to be considered in the optical design, as base curvature will produce field angle-dependent aberrations.

Deformable mirrors function on the principle of having a thin surface that can be deformed to produce the conjugate aberration to the one measured by an associated wavefront sensor and which is incident on the deformable mirror. The deformation is effected by modulating the force applied to the mirror surface by a series of actuators. Most commonly, these are piezo-electric stacks for solid faceplate structures, although different mirror types will take advantage of different physical phenomena to create the localized deformations (e.g. electrostatic forces, bimorphic structures, etc. The actuator patterns may be rectilinear or arranged in other patterns, such as those describing various Zernike modes.

However constructed, prior art deformable mirrors suffer from one common limitation: actuator stroke is typically limited to a maximum of approximately 10 microns. Each actuator has a maximum slope and there is often some cross-talk between actuators. The cross-talk results in an inability to get full, independent motion from each actuator. Furthermore, because of the stroke limitations, the amount of aberration that can be corrected is limited. In most atmospheric aberration scenarios, the strengths of the various aberrations form an approximately geometric progression starting with tilt and progressing through the higher order aberrations (e.g. defocus, spherical, astigmatism, and coma). Most importantly, tilt can strongly dominate other aberrations. Thus, the stroke required to correct the tilt can leave little stroke left for correcting the higher order aberrations, as illustrated in FIGS. 1-3.

Known prior art includes: (1) U.S. Pat. No. 7,638,768, "Laser Wavefront Characterization", L. J. Otten, et al.; (2) U.S. Pat. No. 8,009,280, "Wavefront Characterization and Correction". G. R. Erry, et al.; and (3) U.S. Pat. No. 8,322,870, "Fast Steering, Deformable Mirror System and Method for Manufacturing the Same," Kirk A. Miller.

SUMMARY OF THE INVENTION

The present invention separates the tilt correction from the higher order modes (e.g. defocus, spherical, astigmatism, and coma at the level of $3_{rd}$ and higher order aberrations, up to the limits of a particular mirror design) in order to use all of the available stroke for correcting the higher order modes. The separation is done by placing the deformable mirror in a gimbaled structure, so that the deformable mirror can be tilted in two independent, orthogonal axes.

DESCRIPTION OF THE PREFERRED EMBODIMENT

Figure 1:
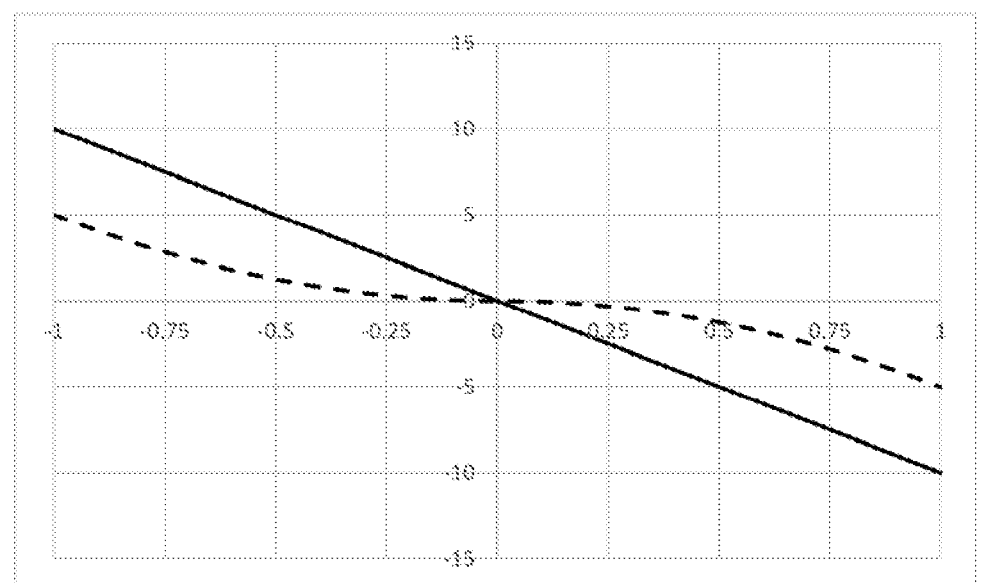
FIG. 1 is a graph illustrating examples of two aberrations that may be corrected by a deformable mirror. The x-axis is the normalized radial coordinate; the y-axis is the magnitude of the aberration in microns.
Figure 2:
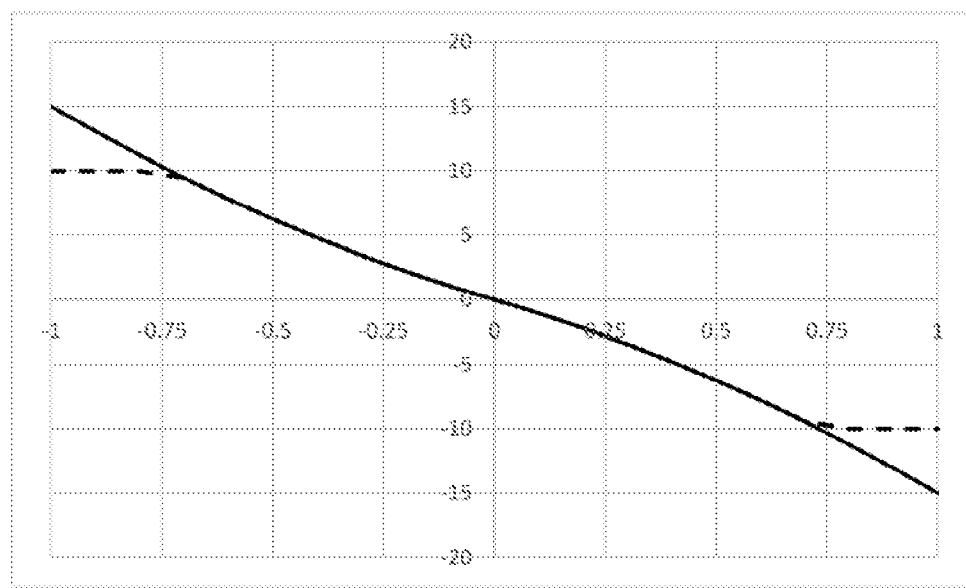
FIG. 2 is a graph illustrating the combination of the aberrations shown in FIG. 1 (solid line) and the effect of limited mirror stroke (dashed line). Again, the x-axis is the normalized radial coordinate; the y-axis is the magnitude of the aberration in microns.
Figure 3:
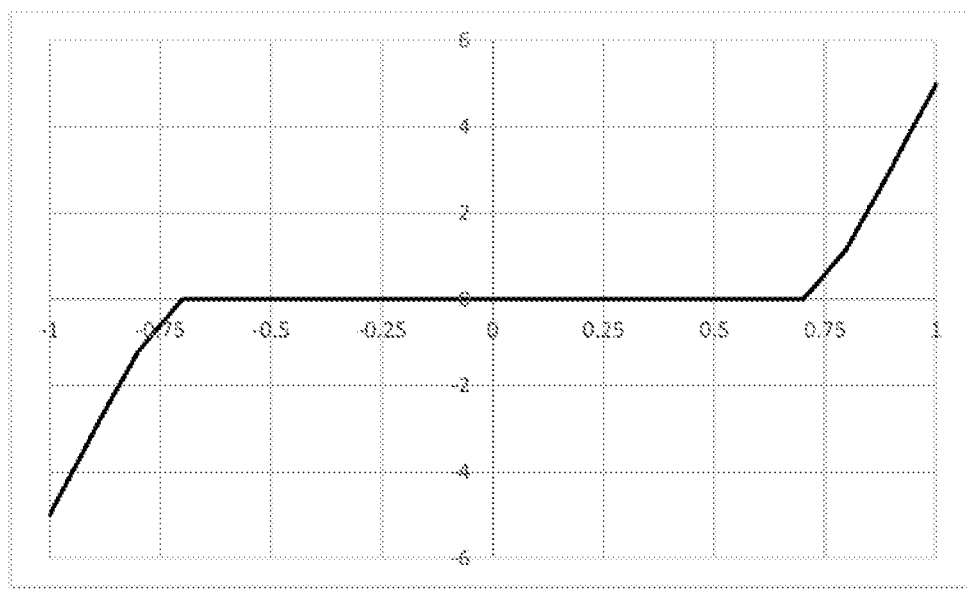
FIG. 3 is a graph of the residual wavefront error due to mirror "clipping" as it has insufficient stroke to correct tip/tilt and more complex aberrations. And, again, the x-axis is the normalized radial coordinate; the y-axis is the magnitude of the aberration in microns.
Figure 4:
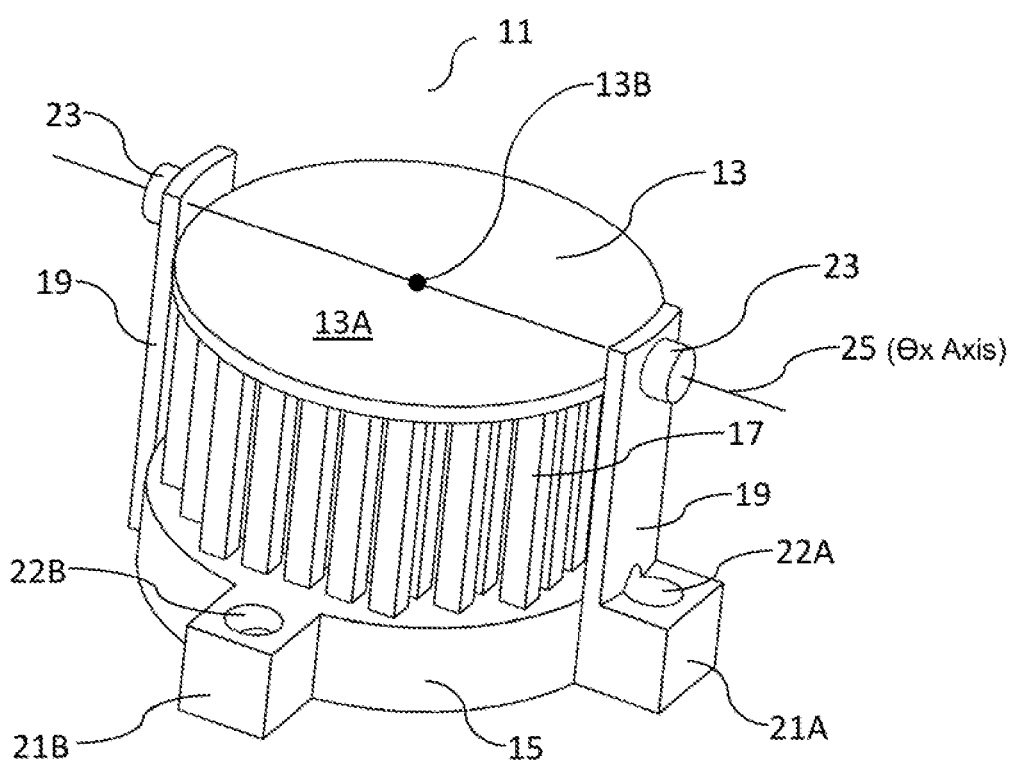
FIG. 4 illustrates the basic structure of the deformable mirror and piezoelectric actuator stack array sub-assembly of the present invention.

The basic structure of the deformable mirror sub-assembly 11 is shown in FIG. 4, including deformable mirror 13 including face 13A and center point 13B, base 15 and piezoelectric actuator stack array 17 permanently attached between mirror 13 and base 15. As illustrated, base 15 includes gimbal cage support arms 19, including gimbal cage pivots 23, and piezoelectric stack supports 21A and B. With this arrangement assembly 11 (including mirror 13, base 15 and arms 19) pivots about axis 25 (the θ (tip) axis). The individual piezoelectric actuators of stack array 17 are bonded to both base 15 and deformable mirror 13. Alternately, for instance, a magnetic voice coil array (not shown) can be used in place of piezoelectric actuator stack array 17.

Figure 5:
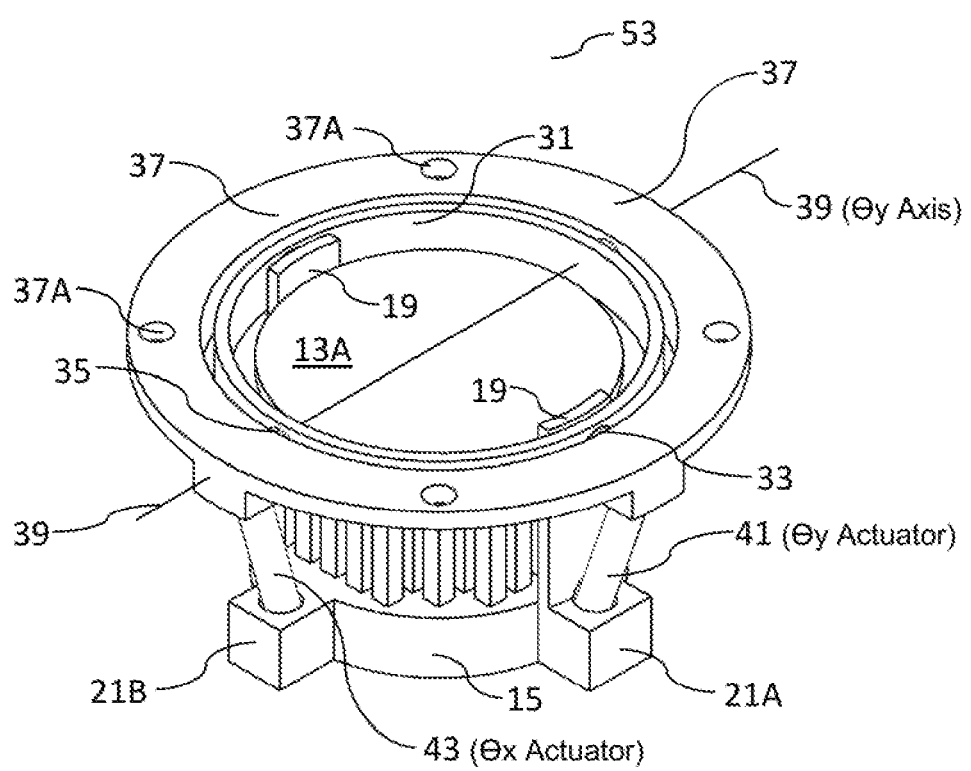
FIG. 5 illustrates the deformable mirror/piezoelectric actuator stack array and gimbal cage which constitutes the deformable mirror assembly of the present invention.

As illustrated in FIG. 5, the deformable mirror sub-assembly 11 is then installed into gimbal cage (or ring) 31, with pivots 23 received in pivot supports 33 for rotation about axis 25. Ring 31 includes pivots 35 which, in turn, are received in pivot supports (not shown) in support ring 37. With this arrangement, ring 31 pivots about axis 39 (the θy (tilt) axis) relative to support ring 37. And, assembly 11 (including mirror 13, base 15 and arms 19) pivots about axis rotate about axis 25 (the θx (tip) axis). In combination with a wavefront sensor, support ring 37 is secured to the associated supporting structure by fasteners (not shown), which are received in fastener openings 37A. θy piezoelectric stack 41 and θx piezoelectric stack 43, all as shown in FIG. 5, provide the tip (θx) and tilt (θ$_y$) capabilities. Piezoelectric stack 41 is captured or adhered between cavity 22A in support 21A and a cavity (not shown) in support ring 37. Similarly, stack 43 is captured between cavity 22B in support 21B and a cavity (also not shown) in support ring 37.

Figure 6:
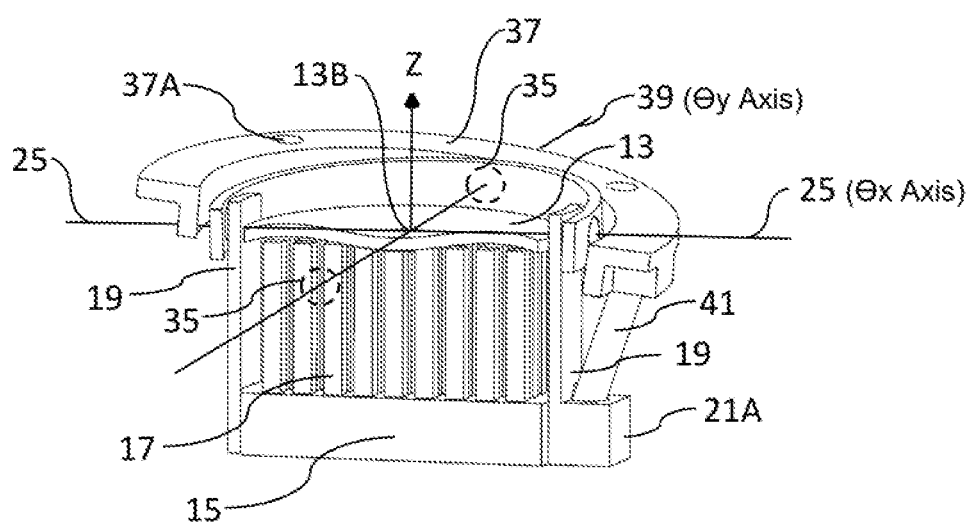
FIG. 6 is a sectional view of the apparatus of FIG. 5 with the mirror deformed and tilted.

There are a number of important considerations to effecting the rotation about mirror face 13A in order to correct higher order aberrations First, the gimbal must be designed so that pivot point 13B, which is the intersection of the θx, θy and Z axes (as shown in FIG. 6) is the nominal location of the center of deformable mirror 13. Failure to do so means that the mapping between the associated wavefront sensor (not shown) and the mirror is corrupted as the mirror pivots. This mapping error corrupts the deformable mirror influence function and creates a poorly responding or unstable system. Second, the gimballing is effected using orthogonal axes, e.g. orthogonal axis 25 (θx) and 39 (θy) in the nominal plane of mirror surface 13A. This is important because the crosstalk created by non-orthogonal axes makes efficient control of the deformable mirror difficult. Third, even though the present invention allows for the compensation of larger aberrations, particularly tilt, it is important to understand that in any imaging application, where the light incident on the deformable mirror is coming from a variety of field points, optimal performance comes from keeping the deformable mirror as close to normal to the optical (Z) axis as possible, as large tilt angles, even when properly gimbaled, also create the mapping error previously discussed. It should be obvious to the experienced practitioner in the art that the separation of the tilt from the rest of the deformable mirror as illustrated by the apparatus of FIGS. 4-6, is not the same as making the tilt function a fast steering mirror. Fast steering mirrors compensate for system motion, typically driven by a control loop controlled by a gyroscope or some similar motion sensor, to take out platform motion and are well suited to compensate for relatively severe platform vibration. In contrast, the present invention is driven by the output from a wavefront sensor and is inherently suited to smaller corrections. In a sufficiently stable environment, the present invention can replace a fast steering mirror. In a high vibration environment, however, an ideal system would enjoy the advantages of both a fast steering mirror and the enhanced, fine correction produced by the present invention.

Most wavefront correction systems, such as those using a Shack-Hartmann sensor, require separate methods of measuring tip/tilt and higher order aberrations. However, the distorted grating wavefront sensor (such as disclosed in U.S. Pat. No. 7,638,768) is able to measure both tip/tilt and higher order aberrations with a single sensor. The combination of the gimbaled deformable mirror disclosed herein and the distorted grating wavefront sensor therefore offers the novel solution of a single sensor and single deformable mirror, compared with conventional systems which require two sensors and two mirrors (one for tip/tilt and one for higher order aberrations). Such a single sensor and single deformable mirror can be extremely compact and robust.

Figure 7:
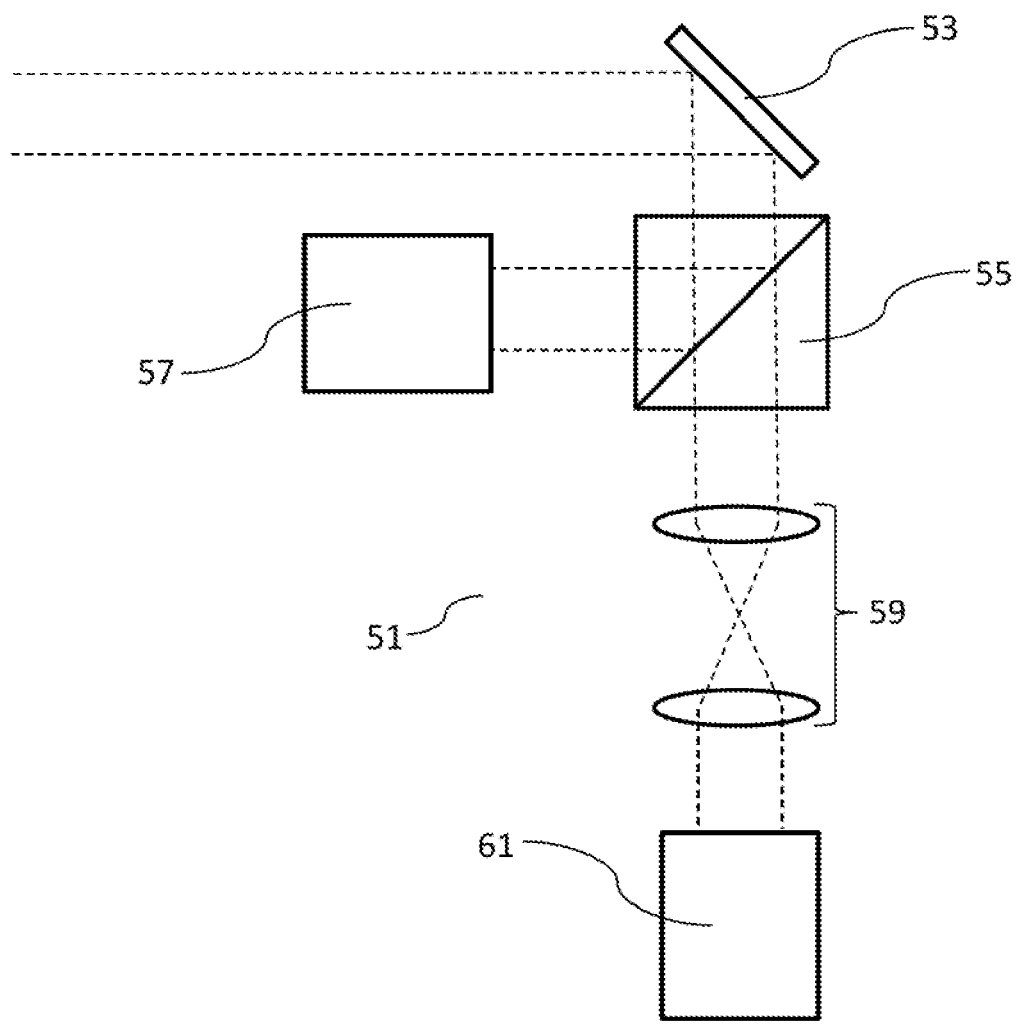
FIG. 7 is an optical schematic illustrating the use of the gimbaled tip/tilt deformable mirror of the present with distorted grating wavefront sensor.

With reference to FIG. 7, adaptive optics system 51 includes the gimbaled tip/tilt deformable mirror of the present invention 53 (e.g., assembly 11, gimbal cage 31, support ring 37), beam splitter 55, imaging camera 57, re-imaging system 59 and distorted grating wavefront sensor 61. As illustrated, AO system 51 is a closed loop configuration, where the wavefront sensor 61 follows gimbaled tip/tilt deformable mirror assembly 53 in the optical system. Alternately, the gimbaled tip/tilt deformable mirror assembly may be used in an open loop configuration, where such assembly follows the wavefront sensor.

The ability to use a single detector and single deformable mirror greatly simplifies the electronic and/or software control loop required for optical correction as there is no possibility of crosstalk between different sensors and mirrors because, in contrast to the present invention, if two sensors were used to drive a combined tip/tilt and higher order mirror, or conversely a single detector were to drive separate mirrors, it is likely that the two separate control loops required would "fight" each other, wherein one system would try to correct small systematic errors from the other leading to instability. In conventional systems with two independent control loops (one sensor driving a tip/tilt mirror and another sensor driving a higher order deformable mirror) crosstalk between the systems is almost inevitable and requires complex processing to ensure stable control. The combination of the distorted grating wavefront sensor and the gimbaled tip/tilt and higher order deformable mirror of the present invention eliminates these issues and provides inherently stable control.

Whereas the drawings and accompanying description have shown and described the preferred embodiments of the present invention, it should be apparent to those skilled in the art that various changes may be made in the forms and uses of the inventions without affecting the scope thereof.

We claim:

1. A gimbaled tip/tilt deformable mirror assembly including:
   a deformable mirror, including a front surface;
   a mirror support member, including means for rotatably supporting the mirror about a first axis located at the front surface (herein the "first rotatable support means");
   means supported between the mirror and the mirror support member for deforming the surface of the mirror; and
   means supported by the mirror support member for rotatably supporting the mirror about a second axis located at the front surface (herein the "second rotatable support means"), the second axis orthogonal to and intersecting with the first axis.

2. The assembly of claim 1, wherein the front surface includes a pivot point and wherein both the first axis and the second axis intersect with the pivot point.

3. The assembly of claim 2, wherein the mirror includes an optical axis, the mirror optical axis passing through the pivot point.

4. The assembly of claim 1, wherein the "first rotatable support means" includes: a first pair of pivot supports, and means, supported by the mirror support member, for rotating the mirror about the first axis, the first axis passing through this first pair of pivot supports.

5. The assembly of claim 4, wherein the means for rotating the mirror about the first axis is an actuator.

6. The assembly of claim 1, wherein the "second rotatable support means" includes: first and second members, the first member connected to the mirror support member by a first pair of pivot supports, the second member connected to the first member by a second pair of pivot supports, the second axis passing through the second pair of pivot points; and means supported by the mirror support member and the second member for rotating the mirror about the second axis.

7. The assembly of claim 6, wherein the means for rotating the mirror about the second axis is an actuator.

8. The assembly of claim 6, wherein the "first rotatable support means" includes: the first pair of pivot supports, and means, supported by the mirror support member, for rotating the mirror about the first axis, the first axis passing through this first pair of pivot supports.

9. The assembly of claim 8, wherein the means for rotating the mirror about the first axis is an actuator supported between the mirror support member and the second member the "second rotatable support means".

10. The assembly of claim 1, further including a wavefront sensor coupled to the deformable mirror assembly to provide the drive signal to the deformable mirror based on a measured wavefront aberration.

11. The assembly of claim 10, wherein the wavefront sensor is a distorted grating wavefront sensor.

* * * * *